3,590,018
ORGANOPHILIC CLAY
Stanley E. Gebura, Mountain Lakes, N.J., assignor to Interpace Corporation, Parsippany, N.J.
No Drawing. Filed May 29, 1968, Ser. No. 732,835
Int. Cl. C08f *45/06;* C08g *51/06;* C09c *1/28*
U.S. Cl. 260—40                                    15 Claims

ABSTRACT OF THE DISCLOSURE

A process has been provided for polymerizing a particular termonomer system onto surfaces of siliceous substances. By varying the component parts of the termonomer system, modified siliceous substances, such as clays and silicas, are obtained which may possess diverse properties, one from the other. Moreover, modified siliceous substances may be obtained with properties which meet specified requirements. Products prepared by this process are within the scope of the invention as are the uses of these surface modified products for purposes as adjuvants in poly(ester) and oleaginous composition formulations. The particular termonomer system consists of a major monomer, $M_1$; a monomer which regulates the polarity of the system, $M_2$; and a monomer, $M_3$, which cross-links and thus prevents displacement of the polymerizate of $M_1$, $M_2$ and $M_3$ from the surface of the siliceous substance when the siliceous substance is incorporated such as in poly(ester). An example of suitable termonomer systems is styrene, dimethylamino ethyl methacrylate and divinylbenzene in a weight ratio of 98:2:0.1, respectively.

---

This invention relates to a process for preparing siliceous substances by polymerizing a particular combination of monomers onto surfaces of siliceous substances. A product obtained by the practicing of this process is within the scope of the invention as are the uses of this product, such as in combination with polyester, oleaginous, paint, poly(vinyl chloride), and alkyd, as well as adhesive, putty and grout compositions.

A major reason for modifying siliceous substances is the relative availability of these low-cost materials, and, thus, the attendant economic advantages if these materials may be employed as adjuvants or substitutes for a more scarce or expensive material. Another major reason for modifying these siliceous substances is the extremely small particles which are useful for bodying various materials. These particles may be obtained by appropriately working up the naturally occurring clays by various processes well known to the art. Thus, if these small particles which possess large surface area per unit of weight are admixed with various liquids, a pronounced bodying effect is obtained. Hence, for this purpose, properly modified clays are useful in fluids such as paints, greases, oils, adhesive and grouting compositions, etc. Consequently, an important reason for seeking modification of clay surfaces is to obtain proper compatibility and dispersions of the siliceous material.

A primary reason for modifying the surface of clays and siliceous substances to make these useful for the above purposes is the natural tendency of these surfaces to be hydrophilic and organophobic. Hence, to render these siliceous materials, e.g., clays, useful in materials derived from organic compounds, the objective is to make these hydrophobic and organophilic. Obviously, depending on the material to which these siliceous substances will be added, various modifications are possible and have been proposed.

The foregoing makes it clear that many expensive materials have been sought to be substituted in whole or in part by siliceous materials and that in the process, siliceous materials have been sought, which if modified, can substitute or replace the expensive material. Needless to say, a proper mating of a siliceous substance as adjuvant with another material involves a multitude of problems, many interrelated and most of these highly unpredictable.

More importantly though, in order to render each siliceous substance suitable as an adjuvant, many prerequisites have to be met. Hence, a number of criteria have to be satisfied before a proper combination of the material and its siliceous substance adjuvant can be found. It is for this reason that the finding of a proper combination of material and adjuvant has been and still is an empirical art with few, if any, guidelines. Consequently predictable results in this field have eluded the prior art practitioner.

PRIOR ART

A number of processes have been disclosed in the prior art for modifying siliceous substances with compounds possessing ethylenically unsaturated moieties.

As a general rule, prior art processes for modifying clays with ethylenically unsaturated monomers have depended, first, on reacting the siliceous substance with a coupling compound or a derivative thereof. These coupling compounds possess an unsaturated radical or a radical supposedly capable of entering into a polymerization reaction with the ethylenically unsaturated monomer. These coupling aids are derived from compounds such as an amine, an alcohol, a quarternary ammonium compound, a sulfinium salt or compound, salts of ethylenically unsaturated acids, polymers containing the above groups, or various siloxanes, silanes or organic silicon derivatives, e.g., organosilicon halides.

Not only do these coupling compounds add another step in the polymerization process, but also the added cost of an element in this type of combination is often prohibitive when modifying such a low-price commodity as clay.

Other methods of polymerizing ethylenically unsaturated compounds on the surface of a siliceous substance depend on depositing a free radical generating compound such as peroxide or an azo compound and then, under appropriate conditions, polymerizing an ethylenically unsaturated compound with this siliceous substance. However, merely because a free radical generating compound is deposited on the surface does not necessarily result in a polymerization on or at the surface, and considerable amounts of polymer are formed in a reaction solution. An analogous process to that above employs an acid for treating ion exchange active clays and then reacting the same with compounds such as conjugated diolefins. It is believed that only low molecular weight polymers are formed in this process.

Still another method of polymerizing the ethylenically unsaturated compounds depends on the presenting of freshly ground or fractured surfaces to the monomer and, thus, effecting polymerization. Because of long grinding times, imprecise polymerization controls, the polymerization mechanism, and concurrent grinding and polymerization, this process has failed as a viable alternative for modifying siliceous substances. Further, in instances where the process has been employed, silica surfaces derived from quartz, silica sand, flint, etc., have been used. These are extremely hard particles, not related to fine particle clays or silica occurring in a natural state or synthetically and, therefore, require great expenditure of energy for every grinding operation.

Despite the various processes and products which have been prepared, it is still impossible to predict whether or not the physical and chemical properteis of clay polymerizates will be acceptable. Merely as an example, it is still impossible to foretell what viscosity characteristics or the magnitude thereof will be displayed by a modified clay onto which surface a homopolymer has formed in oil or in a polyester. Thus, when added to an oleaginous fluid, some of the homopolymer modified clays increase the viscosity while others decrease the viscosity in reference to the same but unmodified clay added to the fluid.

From the previous prior art processes and problems, it is apparent that many routes have been tried to obtain a properly modified clay surface. Despite the profusion of processes and approaches, it is still an art to find a proper polymer system which achieves the satisfactory results on the basis of monomer utilizations, monomer depositions, surface properties of the, thus, modified product, etc.—products which may be employed in systems to which siliceous materials are generally added.

It has been found that surfaces of siliceous substances can now be modified in an unexpectedy advantageous manner by reacting the siliceous substances with a terpolymer system possessing a combination of properties derived from a combination of monomers.

Heretofore, it has not been proposed to modify siliceous substances by employing the particular termonomer system disclosed herein for producing polymerizates on surfaces of siliceous substances.

Thus, it has been found that by varying the component parts of the termonomer system, modified siliceous substances, more particularly clays such as kaolinite and silicas both natural and synthetic, i.e., precipitated and pyrogenic, are obtained which may possess diverse properties. Unexpectedly, these modified clays differ one from the other, often in a far reaching manner, by a change of one monomer in a system and a small percentage at that. This unexpected variation in the properties allows the obtention of clays and silicas which meet specified requirements based on compatibility as fillers, viscosity, hydrophobicity, polarity of the system, etc. More surprisingly, the use of a termonomer system permits the use of monomers which would nomally not be satisfactory as precursors for modifying the siliceous substances as homopolymerizates.

SILICEOUS SUBSTANCES

As siliceous substances within the purview of this invention are clays such as kaolinite, attapulgite, montmorillonite, illite, and pyrophillite, mullite, wollastonite. Other siliceous substances are silicas both natural and synthetic, i.e., pyrogenic and precipitated, as well as micaceous materials.

"Kaolin clay" or "kaolin" describes several hydrated aluminosilicate minerals, generally of plate-like structure and comprising species: kaolinite, nacrite, halloysite, dikcite. Kaolinitic materials are described by the general formula $Al_2O_3 \cdot 2SiO_2 \cdot xH_2O$ in which $x$ is usually 2. The weight ratio of $SiO_2$ to $Al_2O_3$ is 1.18, and kaolin clays normally possess $SiO_2/Al_2O_3$ ratios from 1.0 to 1.5.

A representative kaolin clay is Hydrite 10 obtainable from Whittaker, Clark and Daniels, Inc., 100 Church Street, New York, N.Y. It is a hydrated aluminum silicate (kaolin), non-reactive towards either acids or alkalies.

Typical properties of Hydrite 10 are:

Particle size distribution:

| Equivalent spherical diameter under (microns): | Cumulative, percent |
|---|---|
| 4 | 100 |
| 2 | 95 |
| 1 | 80 |
| 0.5 | 44 |
| 0.2 | 7 |

Chemical composition:

| | |
|---|---|
| Silica ($SiO_2$) | 44.94 |
| Aluminum oxide ($Al_2O_3$) | 38.22 |
| Ferric oxide ($Fe_2O_3$) | 0.27 |
| Calcium oxide (CaO) | 0.06 |
| Magnesium oxide (MgO) | 0.28 |
| Titanium dioxide ($TiO_2$) | 1.75 |
| Potash ($K_2O$) | 0.04 |
| Soda ($Na_2O$) | 0.21 |
| Loss on ignition | 13.6 |
| Moisture (max.) | 1.0 |
| Free moisture | 0.52 |

Another suitable clay is "Ione" air floated kaolin clay available from Interpace, Parsippany, New Jersey. Typical properties of the last are:

Physical properties:

| | |
|---|---|
| Specific gravity | 2.60 |
| Moisture (max.) percent | 0.5–1.0 |
| Screen residue 325 mesh (max.) percent | 0.0–0.1 |
| Particle size, percent: | |
| Minus 2 microns | 50–55 |
| Plus 5 microns | 20–25 |

Chemical analysis:

| | |
|---|---|
| Silica, percent | 45.0–47.0 |
| Alumina, percent | 37.5–39.0 |
| Iron oxide, percent | 0.3–0.5 |
| Titanium dioxide, percent | 1.5–2.0 |
| Ignition loss | 13.0–14.0 |

Other suitable siliceous materials are the Glomax series of kaolin clays such as Glomax LL available from Georgia Kaolin Co. The properties of these series of clays are defined in its Bulletin TSB–5 (this bulletin also gives fairly typical particle size distribution curves for kaolin clays). Another typical calcined clay is Burgess 30. A representative wollastonite is available from Cabot Corp. under the trade name Cab-O-Lite.

As still other siliceous substances, both natural and synthetic silicas are also within the purview of this invention. Examples of synthetic silica include both precipitated and pyrogenic types. Of the latter, the following are representative, Hi-Sil available from Pittsburgh Plate Glass Co. and Ludox available from E. I. du Pont de Nemours & Co. Suitable natural silica examples are MiSil A–15 and "Amorphous Silica 'O' Grade" available from Illinois Mineral Company, Cairo, Ill.

Representative properties of "Amorphous Silica 'O' Grade" are as follows:

Physical Properties:
  Molecular weight—60.09
  Melting point—3100° F. (1722° C.)
  Hegman gauge (fineness of grind)—5.5
  200 mesh screen (thru)—99.99%
  325 mesh screen (thru)—93.73%
  400 mesh screen (thru)—98.92%
  Av. part. side (Fisher sub sieve)—2.35
  Specific surface area, cm.$^2$/g.—9,635

Particle side distribution: Percent
    40 micron diameter, below _____ 95.50
    20 micron diameter, below _____ 82.00
    15 micron diameter, below _____ 73.00
    10 micron diameter, below _____ 61.00
    7.5 micron diameter, below _____ 58.00
    5.0 micron diameter, below _____ 46.00

Further Amorphous A–15 Grade Silica Mi-Sil has essentially the same chemical properties except for the following:

Physical properties:
    Hegman Gauge (Fineness of Grind)—6.5 to 7.0
    200 Mesh Screen (thru)—100.00%
    325 Mesh Screen (thru)—100.00%
    400 Mesh Screen (thru)—99.99%
    Av. Part. Size (Fisher Sub Sieve)—1.82
    Specific Surface Area, cm.$^2$/g.—12,440

Particle side distribution: Percent
    40 micron diameter, below _____ 100.00
    20 micron diameter, below _____ 100.00
    15 micron diameter, below _____ 99.00
    10 micron diameter, below _____ 96.00
    7.5 micron diameter, below _____ 87.00
    5.0 micron diameter, below _____ 70.00

Although siliceous substances of various particle sizes may be employed in this process, the range of average particle sizes considered critical is from submicron to 15 microns.

As can be appreciated, the above siliceous substances are given merely by way of an example, the diverse, useful siliceous substances having been recited previously.

For purposes of suitable comparisons on a relative as well as on an absolute scale of the various properties of the novel, modified siliceous substances, Hydrite 10 is used as a standard.

THE TERMONOMER SYSTEM

As indicated previously, a particular combination of monomers has been unexpectedly found to permit modification of the physical and chemical properties of a siliceous substance. This invention has been predicated on the unexpected discovery that by merely varying a component of a termonomer system, the over-all properties of poly(termonomer) modified siliceous system can be modified in a far-reaching manner. Thus, despite the fact that $M_1$, the major component, i.e., from 60% to 98%, of the termonomer system may be a monomer imparting certain properties to the modified siliceous substance, a mere addition of, say as little as, 2% of a second monomer, $M_2$, vastly changes the properties of the, thus, modified system.

However, the above is predicated on the use of a third, essential component, $M_3$, in the termonomer system to achieve the particular co-action. Hence, the third component in the terpolymer system is a diethylenically unsaturated compound capable of entering into the reaction with the previous two monomers to cross-link the poly(termonomer). Because of the cross-linking, the poly(termonomer) is not readily displaced by solvents or re-agents into which the siliceous substrate may be added as an adjuvant or extender.

Of the above monomers, $M_1$ is preferably an inexpensive monomer of which styrene is especially attractive. Other useful monomers are: p-chloromethyl styrene, vinyl toluene, 2,5-dichlorostyrene, α-methyl styrene, and vinyl chloride.

As the second monomer in the terpolymer system, $M_2$ is a monomer which is used to regulate the polarity of the total system. A representative group of these compounds is: acrylic acid and methacrylic acid esters wherein the esters are formed from monohydric alcohols (substituted and unsubstituted) selected from the group consisting of alkyl alcohols having from 1 to 20 carbon atoms such as lauryl methacrylate, lauryl acrylate, stearyl acrylate, stearyl methacrylate; substituted amino alcohols having from 2 to 7 carbon atoms in the alkyl chain and from 1 to 7 carbon atoms in the alkyl chains on the amino moiety such as N,N-dimethylaminoethyl acrylate, N-t-butylaminoethyl methacrylate, N,N-diethylaminoethyl acrylate, 2-N-morpholinethyl methacrylate and the like; nitro alcohols wherein the alkyl chain has from 2 to 7 carbon atoms such as 3-nitro-2-butanol; cyanoalkyl alcohols wherein the alkyl chain has from 2 to 7 carbon atoms such as 2-cyanoethyl acrylate; acrylic and methacrylic acid amides wherein the amide is formed from ammonia, primary and secondary amine or a diamine having from 1 to 16 carbon atoms such as acrylamine, methacrylamide, ethacrylamide, methylene-bis-acrylamide, t - butylacrylamide, 2-cyanoacrylamide, N,N - diallylacrylamide, N,N-dimethylacrylamide, hexamethylene-bis-acrylamide, N-α-naphthylacrylamide; ethylenically unsaturated nitriles such as acrylonitrile, methacrylonitrile, polymerizable alkylene glycol acrylates and methacrylates, such as hydroxyethyl methacrylate, hydroxypropyl methacrylate and the like; fatty acid esters of 1-olefins from 2–18 carbon atoms wherein the 1-olefin alcohol precursor of the fatty acid esters has from 2–8 carbon atoms, but preferably 2–3 carbon atoms, such as, vinyl acetate, vinyl propionate, vinyl butyrate, vinyl-2-ethyl hexoate, vinyl laurate, vinyl stearate; ethylenically unsaturated aliphatic diacids, such as, maleic acid, fumaric acid, maleic anhydride; nitroethylene, divinylsulfone, divinyl sulfide; ethylenically unsaturated heterocyclic compounds, such as, vinyl pyridines, 2-methyl-5-vinylpyridine, 2-vinyl pyridine, N-vinyl carbazole, N-vinyl pyrrolidone, and other monomers such as sodium p-styrene-sulfonate, diallyl phosphite, diallyl phosphate. Of the various monomers in this group, the following are preferred: acrylonitrile, vinyl pyridine, acrylic and methacrylic acids and esters, divinyl sulfone, diallyl phosphite, and diallyl phosphate.

As the cross-linking monomer, $M_3$, monomers useful for this purpose are divinyl benzene and triallyl cyanurate. Other monomers of special interest are: ethylene glycol dimethacrylate, triethylene glycol dimethacrylate, polyethylene glycol dimethacrylate, tetramethylene dimethacrylate, glyceryl triacrylate.

The preferred combinations of the described monomer system, $M_1$, $M_2$, $M_3$, are: styrene, dimethylamino ethyl methacrylate, and divinyl benzene; styrene, butyl methacrylate, and divinyl benzene (all of the preceding in weight ratio of 98:2:0.1) and styrene, acrylonitrile, and divinyl benzene in weight ratio of 70:30:0.1.

In general, the proportions of the $M_1$, $M_2$, $M_3$ monomers can range from 98:2:0.1 to 1:1:0.2.

INITIATOR

In the polymerization step, peroxide initiators are used. Such peroxidic initiators include hydrogen peroxide, persulfates such as ammonium, sodium or potassium persulfate, hydroperoxides such as t-butyl hydroperoxide, diisopropylbenzene hydroperoxide, cumene hydroperoxide, 1-phenylethylhydroperoxide, etc.; diacylperoxides such as benzoyl peroxide, acetyl peroxide and the like; di-alkyl peroxides such as di-t-butyl peroxide, dicumyl peroxide, etc.; peresters such as t-butyl peroxyacetate, t-butyl peroxybenzoate and the like; peracids such as performic acid, peracetic acid, perbenzoic acid, peroxylactic acid and the like; and other initiators such as dialkyl peroxydicarbonates, azobisisobutyronitrile and the like. These compounds must be capable of initiating a free radical polymerization by themselves or in the presence of an activator, such as a reducing agent. In accordance with the common practices in the polymerization art, those initiators are chosen which at the temperatures employed readily cause polymerization to take place. As would be expected, the initiator should be uniformly distributed throughout the reaction medium.

DESCRIPTION OF PROCESS

The reaction is conveniently carried out in a reaction vessel, provided with a stirrer, reflux condenser and, optionally, with an inlet for an inert gas such as nitrogen. An appropriate amount of clay such as Hydrite 10 is dispersed in de-ionized water (obtained by using commercial ion-exchange resins) and is introduced into the vessel. A ratio of 1:1 to 10:1, generally 1:1 to 3:1, water to clay on weight basis is suitable; a preferred range is 25 to 45% of solids. To this dispersion is added an initiator of the above-described class in an amount from 0.1% to 2.0% based on the amount of introduced monomers to be used. In general, the reaction is conducted in both aqueous and non-aqueous solutions from room temperature on up to about the reflux temperature of the particular dispersion, generally from room temperature up to a temperature of 125° C. As it is well known in the art, the temperatures employed are those at which the free radical initiator readily causes polymerization to take place.

Included as solvents are the aromatic, alicyclic and aliphatic hydrocarbons; for example, benzene, toluene, xylene, cumene, cyclohexylbenzene, cyclohexane, dimethylpentane, hexane, octane, dodecane, naphthas boiling between 50° C. and 150° C., and the like. Choice of a suitable quantity of solvent is principally dependent upon ease of manipulation. From 1 to 5 parts by weight of solvent per weight of clay is usually sufficient. The above solvents are employed as long as the comonomers used are reasonably soluble therein.

The total mixture is reacted for a period which will depend upon the temperature, clay, and added monomers involved, but will generally range from 1 to 10 hours. Following this reaction, the modified clay or siliceous substance is recovered by filtration and drying below the temperature at which the modified product decomposes. Thereafter, the product is pulverized and incorporated as an adjuvant in one of the described materials, e.g., polyester.

Based on practical considerations, the amount of polymer addition is from 0.2% to 5% or even up to 10%. However, generally from 0.5% to 2%, on weight of the siliceous or clay material is a practical range. More importantly, this addition is achieved with little, if any, loss of polymer formation in the solution.

In order to describe the present invention so that it may be more clearly understood, the following examples are set forth in which all parts are expressed in parts by weight unless otherwise stated. The examples are set forth primarily for the purpose of illustration and any specific enumeration of detail contained therein should not be interpreted as a limitation on the concept of this invention.

Examples 1 to 8

These examples illustrate the properties of the modified siliceous substances when compared to unmodified siliceous substances. In Examples 5 to 8, the polymerization process was carried out as follows.

In a one liter, 3-necked flask, fitted with a stirrer, reflux condenser and a nitrogen inlet, a dispersion of 100 g. of indicated kaolin in 400 ml. of de-ionized water was prepared. Instead of water, an appropriate solvent may also be used. To the dispersion was added 3 ml. of 1% potassium persulfate solution followed by about 2.0 g. of a mixture of monomers as indicated in the following table. The mixture was heated at 70° C. ±2° during 3.5 hours while nitrogen was continually swept over the reaction mixture. The mixture was cooled, filtered, dried, and pulverized. A sample of each of the modified kaolin was compared for its viscosity with the unmodified clay in a polyester dispersion. These dispersions contained 40% by weight of the modified clay.

TABLE.—SURFACE PROPERTIES AND POLYESTER DISPERSION VISCOSITIES OF MODIFIED KAOLINS
[Styrene, 98 parts; $M_2$, 2 parts; divinyl benzene, 0.1 part; kaolin, 100 parts; termonomer, 2 parts]

| Example | Kaolin | $M_2$ | Surface | Brookfield viscosity [1] (in c.p.s.) |
|---|---|---|---|---|
| 1 | Ione | | Hydrophilic | 9,500 |
| 2 | Calcined Ione | | do | 10,500 |
| 3 | Calcined Ione air floated | | do | 95,000 |
| 4 | Georgia kaolin Hydrite 10 | | do | 45,250 |
| 5 | Calcined Ione | Dimethylamino ethyl methacrylate | Organophilic | 8,250 |
| 6 | do | Hydroxyethyl methacrylate | do | 10,500 |
| 7 | Calcined Ione air floated | Butyl methacrylate | do | 116,000 |
| 8 | Ione | Acrylonitrile [2] | do | 8,500 |

[1] At 20 r.p.m. of polyester dispersions.
[2] This composition was 70 styrene, 30 acrylonitrile, and 0.1 divinyl benzene.

As mentioned before, the modified clay products are suitable for polyester dispersions as adjuvants therein.

The liquid unsaturated polyester resins employed in producing improved molding compositions of this invention are obtained by reacting together a dihydric alcohol and a dibasic acid, either of which contains a pair of double bonded carbon atoms. The unsaturated long chain polyester molecule is essentially linear and is capable of being cross-linked to form a thermosetting resin solid through the double bonds in the ester. A liquid unsaturated monomer, such as styrene, is employed as a cross-linking solvent, and an organic peroxide is usually employed to initiate the cross-linking reaction. These unsaturated polyesters are characterized by thermosetting without evolution of water. Commercially available unsaturated polyester resins usually contain a mixture of unsaturated polyesters and unsaturated monomer solvent.

Polyols used in the preparation of commercial polyesters include: ethylene glycol; propylene glycol; 1:3 butylene, 2:3 butylene and 1:4 butylene glycols; diethylene glycol, and triethylene glycol.

Maleic anhydride and fumaric acid are the most frequently used unsaturated acids in the preparation of unsaturated polyesters; maleic acid is used to a lesser extent. Other suitable unsaturated acids are citraconic acid, mesaconic acid, itaconic acid, and 3:6 endomethylene tetrahydro phthalic anhydride. Equimolar proportions of glycol and dibasic acid are usually used. The unsaturated acid is frequently modified with a saturated dibasic acid, usually phthalic acid or anhydride, sebacic acid and adipic acid, to improve the flexibility of the thermoset product. In some instances trihydric alcohols, such as glycerine or castor oil, or higher alcohols, such as pentaerythritol or sorbitol, are used to modify the product.

Styrene, diallylphthalate and triallyl cyanurate are the principal cross-linking agents.

As mentioned, the cross-linking reaction is initiated with a peroxide catalyst, usually benzoyl peroxide. Other initiators are methyl ethyl ketone peroxide and methyl isobutyl ketone peroxide.

Accelerators, stabilizers, promotors and coloring agents may be incorporated in the polyester when desired, as well as auxiliary fillers such as fibrous asbestos, calcium carbonates, etc.

In the preparation of moldable polyester mixes employing the novel, coated kaolin, the clay is added to the unsaturated liquid polyester resin in the same manner and with equipment usually employed for adding clay or other fillers to the resin.

Generally, the amount of adjuvant added to a polyester ranges from 10% to 200% based on the polyester; from 28% to 80% is the usual range, although from 40% to 50% is the most common range.

For example, when calcined Ione air floated kaolin was modified with poly(styrene, butyl methacrylate, divinyl benzene, 98:2:1) in accordance with the process as described above in Example 7 and formulated with a polyester resin at 40:60 ratio by weight of modified clay to resin, a dispersion was obtained which is useful for grouting tiles.

Besides the above-demonstrated applications, the siliceous substances as modified according to this invention are also suitable for advantageous incorporation in poly (vinyl chloride) blends, paints, and alkyd base compositions as well as oleaginous, adhesive, putty and grouting composition formulations. In this connection, the conventional testing procedures such as ASTM procedures used in these arts for proving the efficacy of the additives are employed in reference to the herein described adjuvants.

What is claimed is:

1. A fine, particulate inorganic siliceous substance of a particle size up to $15\mu$, said particulate substance having a surface modified with a poly($M_1M_2M_3$) polymerization product in a ratio of 98:2:0.1 to 1:1:0.2 therewith in an amount from 0.2% to 5%, on basis of the weight of dry siliceous substance, wherein $M_1$ is an ethylenically unsaturated monomer, $M_2$ is an ethylenically unsaturated monomer having a polar moiety, and $M_3$ is a diethylenically unsaturated monomer as a cross-linking agent for the poly-($M_1M_2$) polymerizate.

2. A fine, particulate siliceous mineral substance of a particle size of up to $15\mu$, said siliceous substance having as a polymerization product on its surfaces from 0.2% to 5%, on basis of the weight of dry siliceous substance, a poly(termonomer) consisting of monomer precursors $M_1$, $M_2$, and $M_3$ in a ratio of 98:2:0.1 to 1:1:0.2, respectively, wherein $M_1$ is selected from the group consisting of styrene, p-chloromethyl styrene, vinyl toluene, 2,5-dichlorostyrene, α-methyl styrene, and vinyl chloride; $M_2$ is selected from the group consisting of lauryl methacrylate, lauryl acrylate, stearyl acrylate, stearyl methacrylate, N,N-dimethylaminoethyl acrylate, N-t-butylaminoethyl methacrylate, N,N-diethylaminoethyl acrylate, 2-N-morpholinethyl methacrylate, 1-methyl-2-nitropropyl methacrylate, 2-cyanoethyl acrylate, acrylamide, methacrylamide, ethacrylamide, methylene-bis-acrylamide, t-butylacrylamide, 2-cyanoacrylamide, N,N-diallylacrylamide, N,N-dimethylacrylamide, hexamethylene-bis-acrylamide, N-α-naphthylacrylamide, acrylonitrile, methacrylonitrile, hydroxyethyl methacrylate, hydroxypropyl methacrylate, vinyl acetate, vinyl propionate, vinyl butyrate, vinyl-2-ethyl hexoate, vinyl laurate, vinyl stearate, maleic acid, fumaric acid, maleic anhydride, nitroethylene, divinyl sulfone, divinylsulfide, N-vinyl pyrrolidone, sodium p-styrene-sulfonate, diallyl phosphite, and diallyl phosphate; and $M_3$ is selected from the group consisting of divinyl benzene, triallyl cyanurate, glycol dimethacrylate, triethylene glycol dimethacrylate, polyethylene glycol dimethacrylate, tetramethylene dimethacrylate, glyceryl triacrylate.

3. A product according to claim 2 wherein the siliceous substance is kaolin clay.

4. A product according to claim 2 wherein the siliceous substance is natural, pyrogenic, or precipitated silica.

5. A product according to claim 2 wherein the siliceous substance is wollastonite.

6. A product according to claim 2 wherein the siliceous substance has an average particle size range from submicron to less than 15 microns.

7. A product according to claim 2 wherein the siliceous substance has an average particle size range from submicron to less than 10 microns.

8. An oleaginous, alkyd, poly(vinyl chloride) or polymerizable polyester composition comprising as an adjuvant a finely divided particulate inorganic siliceous substance of a particle size up to $15\mu$, said particulate substance having its surfaces modified with a poly($M_1M_2M_3$) polymerization product therewith wherein the ratio of $M_1:M_2:M_3$ is from 98:2:0.1 to 1:1:0.2 in an amount from 0.2% to 10% on basis of the weight of the dry siliceous substance, and wherein the monomer precursor $M_1$ is selected from the group consisting of styrene, p-chloromethyl styrene, vinyl toluene, 2,5-dichlorostyrene, α-methyl styrene, and vinyl chloride; $M_2$ is selected from the group consisting of lauryl methacrylate, lauryl acrylate, stearyl acrylate, stearyl methacrylate, N,N-dimethylaminoethyl acrylate, N-t-butylaminoethyl methacrylate, N,N-diethylaminoethyl acrylate, 2-N-morpholinethyl methacrylate, 1-methyl-2-nitropropyl methacrylate, 2-cyanoethyl acrylate, acrylamide, methacrylamide, ethacrylamide, methylene-bis-acrylamide, t-butylacrylamide, 2-cyanoacrylamide, N,N-diallylacrylamide, N,N-dimethylacrylamide, hexamethylene-bis-acrylamide, N-α-naphthylacrylamide, acrylonitrile, methacrylonitrile, hydroxyethyl methacrylate, hydroxypropyl methacrylate, vinyl acetate, vinyl propionate, vinyl butyrate, vinyl-2-ethyl hexoate, vinyl laurate, vinyl stearate, maleic acid, fumaric acid, maleic anhydride, nitroethylene, divinyl sulfone, divinylsulfide, N-vinyl pyrrolidone, sodium-p-styrenesulfonate, diallylphosphite, and diallyl phosphate; and $M_3$ is selected from the group consisting of divinyl benzene, triallyl cyanurate, glycol dimethacrylate, triethylene glycol dimethacrylate, polyethylene glycol dimethacrylate, tetramethylene dimethacrylate, glyceryl triacrylate.

9. A polymerizable polyester resin according to claim 8 of a dibasic acid and a polyol, optionally dissolved in an unsaturated diluent, comprising as an adjuvant a finely divided particulate inorganic siliceous substance, the finely divided substance having surfaces thereof modified with the poly($M_1M_2M_3$) polymerization product therewith in an amount from 0.2% to 5% on basis of the weight of the dry siliceous substance.

10. A product according to claim 9 wherein the siliceous substance is kaolin or wollastonite.

11. A product according to claim 9 wherein $M_1$ is styrene, $M_2$ is butyl methacrylate, and $M_3$ is divinylbenzene.

12. A product according to claim 2 wherein $M_1$ is styrene and $M_2$ is diallyl phosphate or diallyl phosphite.

13. The method of forming a finely divided organophilic particulate siliceous substance, of particle size up to $15\mu$, said method comprising the steps of: adding the particulate substance to an aqueous medium or an inert solvent, in a ratio 1:1 to 10:1 on a weight basis of said aqueous medium or solvent to particulate; heating to reflux said aqueous medium or solvent; adding to said aqueous medium or solvent a dispersion of monomers $M_1$, $M_2$, and $M_3$, in a ratio of 98:2:0.1 to 1:1:0.2 wherein $M_1$ is selected from the group consisting of styrene, p-chloromethyl styrene, vinyl toluene, 2,5-dichlorostyrene, α-methyl styrene, and vinyl chloride; $M_2$ is selected from the group consisting of lauryl methacrylate, lauryl acrylate, stearyl acrylate, stearyl methacrylate, N,N-dimethylaminoethyl acrylate, N-t-butylaminoethyl methacrylate, N,N-diethylaminoethyl acrylate, 2-N-morpholinethyl methacrylate, 1-methyl-2-nitropropyl methacrylate, 2-cyanoethyl acrylate, acrylamide, methacrylamide, ethacrylamide, methylene-bis-acrylamide, t-butylacrylamide, 2-cyanoacrylamide, N,N-diallylacrylamide, N,N-dimethylacrylamide, hexamethylene-bis-acrylamide, N-α-naphthalylacrylamide, acrylonitrile, methacrylonitrile, hydroxyethyl methacrylate, hydroxypropyl methacrylate, vinyl acetate, vinyl propionate, vinyl butyrate, vinyl-2-ethyl hexoate, vinyl laurate, vinyl stearate, maleic acid, fumaric acid, maleic anhydride, nitroethylene, divinyl sulfone, divinylsulfide, N-vinyl pyrrolidone, sodium p-styrene-sulfonate, diallyl phosphite, and diallyl phosphate; and $M_3$ is selected from the group consisting of divinyl benzene, triallyl cyanurate, glycol dimethacrylate, triethylene glycol dimethacrylate, polyethylene glycol dimethacrylate, tetramethylene dimethacrylate, glyceryl triacrylate; reacting from 1 to 10 hours said monomers in the presence from 0.1 to 2%, based on the amount of introduced monomers, of a peroxidic initiator until a reaction product is formed in an amount from 0.2 to 10% of reaction product on basis of the weight of dry particulate on the surface of said particulate substance; and recovering said particulate substance by filtration and drying.

14. The method according to claim 13 wherein the particulate substance is kaolin, and the particulate substance is added to an aqueous medium, $M_1$ is styrene, $M_2$ is butyl methacrylate, and $M_3$ is divinyl benzene.

15. The method according to claim 13 wherein the particulate substance is kaolin, and the particulate substance is added to an aqueous medium, $M_1$ is styrene, $M_2$ is acrylonitrile, and $M_3$ is divinyl benzene.

References Cited

UNITED STATES PATENTS

| | | | |
|---|---|---|---|
| 3,080,256 | 3/1963 | Bundy | 260—40 |
| 3,138,478 | 6/1964 | Hedman et al. | 260—41.5 |
| 3,374,198 | 3/1968 | Falcone et al. | 260—41.5 |

ALLAN LIEBERMAN, Primary Examiner

U.S. Cl. X.R.

260—41A